(12) United States Patent
Gan et al.

(10) Patent No.: US 6,562,515 B2
(45) Date of Patent: May 13, 2003

(54) ELECTROCHEMICAL CELL HAVING AN ELECTRODE WITH A NITRATE ADDITIVE IN THE ELECTRODE ACTIVE MIXTURE

(75) Inventors: Hong Gan, East Amherst, NY (US); Esther S. Takeuchi, East Amherst, NY (US)

(73) Assignee: Wilson Greatbatch Ltd., Clarence, NY (US)

( * ) Notice: Subject to any disclaimer, the term of this patent is extended or adjusted under 35 U.S.C. 154(b) by 0 days.

(21) Appl. No.: 09/813,569

(22) Filed: Mar. 21, 2001

(65) Prior Publication Data

US 2002/0136950 A1 Sep. 26, 2002

(51) Int. Cl.$^7$ ................................................. H01M 4/60
(52) U.S. Cl. .................. 429/212; 429/322; 429/232; 429/233; 429/231.1; 429/231.2; 429/231.3; 429/231.4; 429/231.5; 429/231.8; 429/231.95
(58) Field of Search ................................ 429/212, 322, 429/231.1, 231.2, 231.3, 231.4, 231.5, 231.8, 231.95, 233, 232

(56) References Cited

U.S. PATENT DOCUMENTS

| | | | |
|---|---|---|---|
| 2,583,589 A | 1/1952 | O'Connor | 136/100 |
| 3,489,611 A | 1/1970 | Braeuer | 136/6 |
| 4,060,674 A | 11/1977 | Klemann et al. | 429/194 |
| 4,132,837 A | 1/1979 | Soffer | 429/194 |
| 4,264,689 A | 4/1981 | Moses | 429/194 |
| 4,654,278 A | 3/1987 | McManis, III et al. | 429/112 |
| 4,786,567 A | 11/1988 | Skyllas-Kazacos et al. | 429/19 |
| 4,894,302 A | 1/1990 | Hoffman et al. | 429/194 |
| 5,112,704 A | 5/1992 | Furukawa et al. | 429/194 |
| 5,478,673 A | 12/1995 | Funatsu | 429/197 |
| 5,658,688 A | 8/1997 | Jolson | 429/194 |
| 5,691,083 A | 11/1997 | Bolster | 429/194 |
| 6,060,184 A | 5/2000 | Gan et al. | 429/3 |
| 6,136,477 A | 10/2000 | Gan et al. | 429/307 |

FOREIGN PATENT DOCUMENTS

| | | |
|---|---|---|
| EP | 5101846 | 4/1993 |
| EP | 0 757 399 A1 | 2/1997 |
| EP | 0829911 A2 | 1/1998 |
| EP | 0 971 432 A1 | 1/2000 |
| GB | 2086644 A | 5/1982 |
| JP | 56-143669 | * 11/1981 |
| JP | 58214281 | 12/1983 |
| JP | 07022068 | 1/1995 |

OTHER PUBLICATIONS

Simon et al., "Electrochemical study of the passivating layer on lithium intercalated carbon electrodes in nonaqueous solvents," Journal of Power Sources, 43–44 (1993), pp. 65–74.

* cited by examiner

*Primary Examiner*—Laura Weiner
(74) *Attorney, Agent, or Firm*—Michael F. Scalise

(57) ABSTRACT

An electrochemical cell of either a primary or a secondary chemistry, is described. In either case, the cell has a negative electrode of lithium or of an anode material which is capable of intercalating and de-intercalating lithium coupled with a positive electrode of a cathode active material. A nitrate compound is mixed with either the anode material or the cathode active material prior to contact with its current collector. The resulting electrode couple is activated by a nonaqueous electrolyte. The electrolyte flows into and throughout the electrodes causing the nitrate additive to dissolve in the electrolyte. The nitrate solute is then able to contact the lithium to provide an electrically insulating and ionically conducting passivation layer thereon.

55 Claims, No Drawings

ELECTROCHEMICAL CELL HAVING AN ELECTRODE WITH A NITRATE ADDITIVE IN THE ELECTRODE ACTIVE MIXTURE

BACKGROUND OF THE INVENTION

1. Field of the Invention

The present invention generally relates to the conversion of chemical energy to electrical energy, and more particularly, to an electrochemical cell of either a primary or a secondary chemistry. In either case, the cell has a negative electrode of lithium or of an anode material which is capable of intercalating and de-intercalating lithium coupled with a positive electrode of a cathode active material. A nitrate compound is mixed with either the anode material or the cathode active material prior to contact with its current collector. The resulting electrode couple is activated by a nonaqueous electrolyte. The electrolyte flows into and throughout the electrodes, causing the nitrate compound to dissolve in the electrolyte. The nitrate solute is then able to contact the lithium to provide an electrically insulating and ionically conducting passivation layer thereon.

2. Prior Art

In a primary cell, the formation of a surface film on an alkali metal anode, especially when the anode is of lithium, is unavoidable. Therefore, the prior art in U.S. Pat. No. 6,060,184 to Gan et al. teaches providing a nitrate additive in the electrolyte to beneficially modify the anode surface film of an alkali metal primary cell, particularly a lithium cell. The nitrate additive interacts with the lithium anode to form an ionically conductive surface layer of a nitrate salt thereon. This salt is more conductive than lithium oxide which may form on the anode in the absence of the nitrate additive. In fact, it is believed that the lithium nitrate or the lithium salt of the nitrate reduction product on the surface of the anode provides for the existence of charge delocalization due to resonance equilibration at the anode surface. This equilibration allows lithium ions to travel easily from one molecule to the other via a lithium ion exchange mechanism. As a result, beneficial ionic conductance is realized. Similarly, U.S. Pat. No. 6,136,477 to Gan et al. describes the provision of a nitrate additive in the electrolyte of a secondary cell.

However, the present invention is the first known attempt to introduce nitrate additives into the chemistry of the cell by having them leach from the cathode active mixture of the positive electrode for a primary or a secondary cell or from the anode material of a secondary cell. Benefits to this approach are that the nitrate compound in a solid form is easily mixed with the electrode material and, if desired, a conductive diluent and a binder, to form a homogeneous mixture which is easily fabricated into an electrode. A cell is formed when the thusly fabricated negative electrode and positive electrode are activated with an electrolyte. The electrolyte serves to wet the electrode material, causing the nitrate additive to dissolve therein. Then, the electrolyte becomes a vehicle for transport of the nitrate compound from the host electrode to form an ionically conductive surface layer on the lithium in a similar manner as if the nitrate compound had been added directly to the electrolyte according to the prior art. However, in contrast to the prior art Gan et al. patents, the electrode material mixed with the nitrate additive serves to meter its beneficial effects as it gradually leaches from the host electrode.

SUMMARY OF THE INVENTION

The present invention relates to both primary and secondary electrochemical cells. An exemplary primary cell is a nonaqueous electrolyte, alkali metal/mixed metal oxide electrochemical cell and, in particular, a lithium/silver vanadium oxide electrochemical cell. Lithium/silver vanadium oxide cells are designed for current pulse discharge applications required in powering an implantable medical device such as a cardiac defibrillator. A defibrillator requires a cell that may run under a light load, device monitoring mode for extended periods of time interrupted by high rate, current pulse discharge during device activation.

Voltage delay is a phenomenon typically exhibited in a lithium/silver vanadium oxide cell that has been depleted of about 40% to about 70% of its capacity and is subjected to current pulse discharge applications. The occurrence of voltage delay is detrimental because it may result in delayed device activation and shortened device life. Rdc build-up is characterized by an increase in cell resistance in lithium/silver vanadium oxide cells that have been depleted of about 50% to about 100% of their capacity. Rdc build-up also results in a lowering of pulse minimum voltages during high rate discharge, which in turn limits the life of the electrochemical cell.

The desirable decrease in both voltage delay and Rdc build-up is realized in primary cells that contain silver vanadium oxide having a nitrate compound mixed therewith. The nitrate compound is mixed with the cathode active material prior to the positive electrode being assembled into the cell. The thusly fabricated positive electrode is electrochemically coupled with a negative electrode and activated with a nonaqueous electrolyte. The electrolyte permeates the positive electrode to wet the cathode active material and serve as a vehicle for dissolving and transporting the nitrate compound to the anode active material. In a primary cell, the nitrate compound reacts with the lithium anode to form an ionically conductive protective film thereon.

In a secondary cell built in a discharged condition, the nitrate compound is mixed with either the cathode active material, preferably of lithium cobalt oxide, or the carbonaceous anode material. The nitrate compound reacts with the lithiated material of the positive electrode and also when the lithium intercalates with the anode material of the negative electrode. The thusly formed nitrate salt at the solid electrolyte interface is responsible for improved cycling efficiency in secondary cells.

These and other objects of the present invention will become increasingly more apparent to those skilled in the art by reference to the following description.

DETAILED DESCRIPTION OF THE PREFERRED EMBODIMENTS

As used herein, the term "pulse" means a short burst of electrical current of a significantly greater amplitude than that of a prepulse current immediately prior to the pulse. A pulse train consists of at least two pulses of electrical current delivered in relatively short succession with or without open circuit rest between the pulses. A typical current pulse is about 15.0 mA/cm$^2$ to about 35.0 mA/cm$^2$.

The electrochemical cell of the present invention is of either a primary chemistry or a secondary, rechargeable chemistry. For both the primary and secondary types, the cell comprises an anode active metal selected from Groups IA, IIA and IIIB of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred metal comprises lithium. An alternate negative electrode comprises a lithium alloy, such as lithium-aluminum alloy. The greater the amount of aluminum present by weight in the alloy, however, the lower the energy density of the cell.

For a primary cell, the anode is a thin metal sheet or foil of the lithium material, pressed or rolled on a metallic anode current collector, i.e., preferably comprising nickel, to form the negative electrode. In the exemplary cell of the present invention, the negative electrode has an extended tab or lead of the same material as the current collector, i.e., preferably nickel, integrally formed therewith such as by welding and contacted by a weld to a cell case of conductive material in a case-negative electrical configuration. Alternatively, the negative electrode may be formed in some other geometry, such as a bobbin shape, cylinder or pellet to allow an alternate low surface cell design.

In secondary electrochemical systems, the anode or negative electrode comprises an anode material capable of intercalating and de-intercalating the anode active material, such as the preferred alkali metal lithium. A carbonaceous negative electrode comprising any of the various forms of carbon (e.g., coke, graphite, acetylene black, carbon black, glassy carbon, etc.) which are capable of reversibly retaining the lithium species is preferred for the anode material. A "hairy carbon" material is particularly preferred due to its relatively high lithium-retention capacity. "Hairy carbon" is a material described in U.S. Pat. No. 5,443,928 to Takeuchi et al., which is assigned to the assignee of the present invention and incorporated herein by reference. Graphite is another preferred material. Regardless of the form of the carbon, fibers of the carbonaceous material are particularly advantageous because they have excellent mechanical properties which permit them to be fabricated into rigid electrodes that are capable of withstanding degradation during repeated charge/discharge cycling. Moreover, the high surface area of carbon fibers allows for rapid charge/discharge rates.

A typical negative electrode for a secondary cell is fabricated by mixing about 90 to 97 weight percent "hairy carbon" or graphite with about 3 to 10 weight percent of a binder material, which is preferably a fluoro-resin powder such as polytetrafluoroethylene (PTFE), polyvinylidene fluoride (PVDF), polyethylenetetrafluoroethylene (ETFE), polyamides, polyimides, and mixtures thereof. This negative electrode admixture is provided on a current collector such as of a nickel, stainless steel, or copper foil or screen by casting, pressing, rolling or otherwise contacting the admixture thereto.

In either the primary cell or the secondary cell, the reaction at the positive electrode involves conversion of ions which migrate from the negative electrode to the positive electrode into atomic or molecular forms. For a primary cell, the cathode active material comprises at least a first transition metal chalcogenide constituent which may be a metal, a metal oxide, or a mixed metal oxide comprising at least a first and a second metals or their oxides and possibly a third metal or metal oxide, or a mixture of a first and a second metals or their metal oxides incorporated in the matrix of a host metal oxide. The cathode active material may also comprise a metal sulfide.

The metal oxide or the mixed metal oxide can be produced by the chemical addition, reaction, or otherwise intimate contact of various metal oxides and/or metal elements, preferably during thermal treatment or chemical vapor deposition in mixed states. The active materials thereby produced contain metals, oxides and sulfides of Groups IB, IIB, IIIB, IVB, VB, VIB, VIIB, and VIII of the Periodic Table of Elements, which includes the noble metals and/or other oxide compounds.

By way of illustration, and in no way intended to be limiting, an exemplary cathode active material comprises silver vanadium oxide having the general formula $Ag_xV_2O_y$ in any one of its many phases, i.e. β-phase silver vanadium oxide having in the general formula x=0.35 and y=5.18, γ-phase silver vanadium oxide having in the general formula x=0.80 and y=5.4 and ε-phase silver vanadium oxide having in the general formula x=1.0 and y=5.5, and combination and mixtures of phases thereof. For a more detailed description of silver vanadium oxide materials, reference is made to U.S. Pat. Nos. 4,310,609 to Liang et al., 5,389,472 to Takeuchi et al., 5,498,494 to Takeuchi et al. and 5,695,892 to Leising et al., all of which are assigned to the assignee of the present invention and incorporated herein by reference.

Another preferred transition metal oxide useful with the present invention is a composite cathode active material that includes $V_2O_z$ wherein z≦5 combined with $Ag_2O$ with the silver in either the silver(II), silver(I) or silver(0) oxidation state and CuO with the copper in either the copper(II), copper(I) or copper(0) oxidation state to provide the mixed metal oxide having the general formula $Cu_xAg_yV_2O_z$, (CSVO). Thus, this composite cathode active material may be described as a metal oxide-metal oxide-metal oxide, a metal—metal oxide-metal oxide, or a metal—metal—metal oxide and the range of material compositions found for $Cu_xAg_yV_2O_z$ is preferably about 0.01≦x≦1.0, about 0.01≦y≦1.0 and about 5.01≦z≦6.5. Typical forms of CSVO are $Cu_{0.16}Ag_{0.67}V_2O_z$ with z being about 5.5 and $Cu_{0.5}Ag_{0.5}V_2O_z$ with z being about 5.75. The oxygen content is designated by z since the exact stoichiometric proportion of oxygen in CSVO can vary depending on whether the cathode active material is prepared in an oxidizing atmosphere such as air or oxygen, or in an inert atmosphere such as argon, nitrogen and helium. For a more detailed description of this cathode active material, reference is made to U.S. Pat. Nos. 5,472,810 to Takeuchi et al. and 5,516,340 to Takeuchi et al., both of which are assigned to the assignee of the present invention and incorporated herein by reference.

Additional cathode active materials for a primary cell include manganese dioxide, cobalt oxide, nickel oxide, copper vanadium oxide, titanium disulfide, copper oxide, copper sulfide, iron sulfide, iron disulfide, and mixtures thereof.

In secondary cells, the positive electrode preferably comprises a lithiated material that is stable in air and readily handled. Examples of such air-stable lithiated cathode active materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$ and $LiCo_{1-x}Ni_xO_2$.

To discharge such secondary cells, the lithium metal comprising the positive electrode is intercalated into the carbonaceous negative electrode by applying an externally generated electrical potential to recharge the cell. The applied recharging electrical potential serves to draw lithium ions from the cathode active material, through the electrolyte and into the carbonaceous material of the negative electrode to saturate the carbon. The resulting $Li_xC_6$ negative electrode can have an x ranging from about 0.1 to about 1.0. The cell is then provided with an electrical potential and is discharged in a normal manner.

An alternate secondary cell construction comprises intercalating the carbonaceous material with the active lithium material before the negative electrode is incorporated into the cell. In this case, the positive electrode body can be solid and comprise, but not be limited to, such active materials as manganese dioxide, silver vanadium oxide, titanium disulfide, copper oxide, copper sulfide, iron sulfide, iron disulfide and fluorinated carbon. However, this approach is compromised by problems associated with handling lithiated carbon outside the cell. Lithiated carbon tends to react when contacted by air or water.

The above described cathode active materials, whether of a primary or a secondary chemistry, are formed into an electrode body for incorporation into an electrochemical cell by mixing one or more of them with a conductive additive such as acetylene black, carbon black and/or graphite. Metallic materials such as nickel, aluminum, titanium and stainless steel in powder form are also useful as conductive diluents when mixed with the above listed active materials. The positive electrode of both a primary and a secondary cell further comprises a binder material which is preferably a fluoro-resin powder such as powdered polytetrafluoroethylene (PTFE) or powdered polyvinylidene fluoride (PVDF). More specifically, a preferred cathode active material for a primary cell comprises SVO in any one of its many phases, or mixtures thereof, and/or CSVO mixed with a binder material and a conductive diluent. A preferred cathode active material for a secondary cell comprises lithium cobalt oxide mixed with a binder material and a conductive diluent.

In primary cells, the addition of at least one of a group of nitrate additives to the cathode active mixture has beneficial effects when the positive electrode is coupled to a negative electrode and activated by a nonaqueous electrolyte. This causes the nitrate additive to dissolve as a solute in the electrolyte to consequently minimize or eliminate voltage delay and reduce Rdc build-up when the cell is subjected to current pulse discharge conditions. For secondary systems, the nitrate additive is provided in either the cathode active mixture or mixed with the carbonaceous anode material to benefit cycling efficiency.

The nitrate additive preferably has the formula: $(RO)N(=O)_2$, wherein R is an organic group of either a saturated hydrocarbon or heteroatom group containing 1 to 10 carbon atoms or an unsaturated hydrocarbon or heteroatom group containing 2 to 10 carbon atoms. The greatest effect is found when propyl nitrate, isopropyl nitrate, butyl nitrate, isobutyl nitrate, t-butyl nitrate, benzyl nitrate, phenyl nitrate, and mixtures thereof are used the additive. Preferably, the nitrate additive is in a range of about 0.05% to about 5.0%, by weight.

The above listed nitrate compounds are only intended to be exemplary of those that are useful with the present invention, and are not to be construed as limiting. Those skilled in the art will readily recognize compounds which come under the purview of the general formulas set forth above and which will be useful as additives to reduce voltage delay and Rdc build-up in a primary cell to increase cycling efficiency in a secondary cell according to the present invention.

In that respect, a preferred positive electrode active admixture according to the present invention comprises from about 80% to 99%, by weight, of a cathode active material comprising either one or both of the SVO and CSVO materials for a primary cell or lithium cobalt oxide for a secondary cell mixed with a suitable binder, a conductive diluent and at least one of the above nitrate compounds. The resulting blended active mixture may be formed into a free-standing sheet prior to being contacted with a current collector to form the subject electrode. The manner in which the electrode mixture is prepared into a free-standing sheet is thoroughly described in U.S. Pat. No. 5,435,874 to Takeuchi et al., which is assigned to the assignee of the present invention and incorporated herein by reference. Further, electrode components for incorporation into both primary and secondary cells may also be prepared by rolling, spreading or pressing the electrode mixture of the present invention onto a suitable current collector. Electrodes prepared as described above may be in the form of one or more plates operatively associated with at least one or more plates of a counter electrode, or in the form of a strip wound with a corresponding strip of the counter electrode in a structure similar to a "jellyroll".

In order to prevent internal short circuit conditions, the positive electrode is separated from the negative electrode by a suitable separator material. The separator is of electrically insulative material, and the separator material also is chemically unreactive with the negative and positive electrode materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from fluoropolymeric fibers including polyvinylidine fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.). The separator may also be composed of non-woven glass, glass fiber materials and ceramic materials.

The form of the separator typically is a sheet which is placed between the negative and positive electrodes and in a manner preventing physical contact therebetween. Such is the case when the negative electrode is folded in a serpentine-like structure with a plurality of positive electrode plates disposed between the folds and received in a cell casing or when the electrode combination is rolled or otherwise formed into a cylindrical "jellyroll" configuration.

The primary and secondary electrochemical cells of the present invention further include a nonaqueous, ionically conductive electrolyte. The electrolyte serves as a medium for migration of ions between the negative and the positive electrodes during the electrochemical reactions of the cell, and nonaqueous solvents suitable for the present invention are chosen so as to exhibit those physical properties necessary for ionic transport (low viscosity, low surface tension and wettability). Suitable nonaqueous solvents are comprised of an inorganic salt dissolved in a nonaqueous solvent system. For both a primary and a secondary cell, the electrolyte preferably comprises an alkali metal salt dissolved in a mixture of aprotic organic solvents comprising a low viscosity solvent including organic esters, ethers, dialkyl carbonates, and mixtures thereof, and a high permittivity solvent including cyclic carbonates, cyclic esters, cyclic amides, and mixtures thereof. Low viscosity solvents include tetrahydrofuran (THF), diisopropylether, methyl acetate (MA), diglyme, triglyme, tetraglyme, 1,2-dimethoxyethane (DME), 1,2-diethoxyethane (DEE), 1-ethoxy, 2-methoxyethane (EME), dimethyl carbonate (DMC), diethyl carbonate (DEC), dipropyl carbonate (DPC), ethylmethyl carbonate (EMC), methylpropyl carbonate (MPC), ethylpropyl carbonate (EPC), and mixtures thereof. High permittivity solvents include propylene carbonate (PC), ethylene carbonate (EC), butylene carbonate (BC), acetonitrile, dimethyl sulfoxide, dimethyl formamide, dimethyl acetamide, γ-valerolactone, γ-butyrolactone (GBL), N-methyl-pyrrolidinone (NMP), and mixtures thereof.

The preferred electrolyte for both a primary and a secondary cell comprises a lithium salts selected from the group of $LiPF_6$, $LiBF_4$, $LiAsF_6$, $LiSbF_6$, $LiClO_4$, $LiAlCl_4$, $LiGaCl_4$, $LiC(SO_2CF_3)_3$, $LiN(SO_2CF_3)_2$, LiSCN, $LiO_3SCF_2CF_3$, $LiC_6F_5SO_3$, $LiO_2CCF_3$, $LiSO_3F$, $LiNO_3$, $LiB(C_6H_5)_4$, $LiCF_3SO_3$, and mixtures thereof. Suitable salt concentrations typically range between about 0.8 to 1.5 molar.

In the present invention, the preferred primary electrochemical cell has a negative electrode of lithium metal and a positive electrode of the transition mixed metal oxide $AgV_2O_{5.5}$ (SVO). For this primary couple, the preferred activating electrolyte is 1.0M to 1.4M $LiAsF_6$ dissolved in an aprotic solvent mixture comprising at least one of the above listed low viscosity solvents and at least one of the above listed high permittivity solvents. The preferred aprotic solvent mixture comprises a 50/50 mixture, by volume, of propylene carbonate and 1,2-dimethoxyethane.

A preferred electrolyte for a secondary cell of a carbon/$LiCoO_2$ couple comprises a solvent mixture of EC:DMC:EMC:DEC. Most preferred volume percent ranges for the various carbonate solvents include EC in the range of about 20% to about 50%; DMC in the range of about 12% to about 75%; EMC in the range of about 5% to about 45%; and DEC in the range of about 3% to about 45%. In a preferred form of the present invention, the electrolyte activating the cell is at equilibrium with respect to the ratio of DMC:EMC:DEC. This is important to maintain consistent and reliable cycling characteristics. It is known that due to the presence of low-potential (anode) materials in a charged cell, an un-equilibrated mixture of DMC:DEC in the presence of lithiated graphite ($LiC_6$~0.01 V vs $Li/Li^+$) results in a substantial amount of EMC being formed. When the concentrations of DMC, DEC and EMC change, the cycling characteristics and temperature rating of the cell change. Such unpredictability is unacceptable. This phenomenon is described in detail in U.S. patent application Ser. No. 09/669,936, filed Sep. 26, 2000, which is assigned to the assignee of the present invention and incorporated herein by reference. Electrolytes containing the quaternary carbonate mixture of the present invention exhibit freezing points below −50° C., and lithium ion secondary cells activated with such mixtures have very good cycling behavior at room temperature as well as very good discharge and charge/discharge cycling behavior at temperatures below −40° C.

The assembly of the primary and secondary cells described herein is preferably in the form of a wound element configuration. That is, the fabricated negative electrode, positive electrode and separator are wound together in a "jellyroll" type configuration or "wound element cell stack" such that the negative electrode is on the outside of the roll to make electrical contact with the cell case in a case-negative configuration. Using suitable top and bottom insulators, the wound cell stack is inserted into a metallic case of a suitable size dimension. The metallic case may comprise materials such as stainless steel, mild steel, nickel-plated mild steel, titanium, tantalum or aluminum, but not limited thereto, so long as the metallic material is compatible for use with components of the cell.

The cell header comprises a metallic disc-shaped body with a first hole to accommodate a glass-to-metal seal/terminal pin feedthrough and a second hole for electrolyte filling. The glass used is of a corrosion resistant type having up to about 50% by weight silicon such as CABAL 12, TA 23, FUSITE 425 or FUSITE 435. The positive terminal pin feedthrough preferably comprises titanium although molybdenum, aluminum, nickel alloy, or stainless steel can also be used. The cell header is typically of a material similar to that of the case. The positive terminal pin supported in the glass-to-metal seal is, in turn, supported by the header, which is welded to the case containing the electrode stack. The cell is thereafter filled with the electrolyte solution described hereinabove and hermetically sealed such as by close-welding a stainless steel ball over the fill hole, but not limited thereto.

The above assembly describes a case-negative cell, which is the preferred construction of either the exemplary primary or secondary cell of the present invention. As is well known to those skilled in the art, the exemplary primary and secondary electrochemical systems of the present invention can also be constructed in case-positive configurations.

It is appreciated that various modifications to the present inventive concepts described herein may be apparent to those of ordinary skill in the art without departing from the spirit and scope of the present invention as defined by the herein appended claims.

What is claimed is:

1. An electrochemical cell comprising a negative electrode, a positive electrode and a nonaqueous electrolyte, the improvement in the cell comprising:

the negative electrode comprising an anode material contacted to an anode current collector and the positive electrode comprising a cathode active material contacted to a cathode current collector, wherein at least one of the anode material and the cathode active material is mixed with a nitrate additive prior to being contacted to the respective anode current collector and cathode current collector, the nitrate additive having the formula: $(RO)N(=O)_2$, wherein R is an organic group of either a saturated hydrocarbon or heteroatom group containing 1 to 10 carbon atoms or an unsaturated hydrocarbon or heteroatom group containing 2 to 10 carbon atoms.

2. The electrochemical cell of claim 1 as either a primary or a secondary electrochemical cell.

3. The electrochemical cell of claim 1 wherein the nitrate additive is selected from the group consisting of propyl nitrate, isopropyl nitrate, butyl nitrate, isobutyl nitrate, t-butyl nitrate, benzyl nitrate, phenyl nitrate, and mixtures thereof.

4. The electrochemical cell of claim 1 wherein the nitrate additive is present in at least one of the negative electrode and the positive electrode in a range of about 0.05% to about 5.0%, by weight.

5. The electrochemical cell of claim 1 wherein the electrochemical cell is a primary cell and the negative electrode is comprised of lithium or a lithium-aluminum alloy.

6. The electrochemical cell of claim 1 as a primary cell and the cathode active material is selected from the group consisting of silver vanadium oxide, copper silver vanadium oxide, manganese dioxide, cobalt oxide, nickel oxide, copper oxide, copper sulfide, iron sulfide, iron disulfide, titanium disulfide, copper vanadium oxide, and mixtures thereof.

7. The electrochemical cell of claim 6 wherein the positive electrode comprises from about 80 to about 99 weight percent of the cathode active material.

8. The electrochemical cell of claim 7 wherein the positive electrode further comprises a binder material and a conductive additive.

9. The electrochemical cell of claim 8 wherein the binder material is a fluoro-resin powder.

10. The electrochemical cell of claim 8 wherein the conductive additive is selected from the group consisting of carbon, graphite powder, acetylene black, titanium powder, aluminum powder, nickel powder, stainless steel powder, and mixtures thereof.

11. The electrochemical cell of claim 1 as a secondary cell and the cathode active material is selected from the group consisting of oxides, sulfides, selenides, and tellurides of metals selected from the group consisting of vanadium, titanium, chromium, copper, molybdenum, niobium, iron, nickel, cobalt and manganese.

12. The electrochemical cell of claim 1 as a secondary cell and the anode material is selected from the group consisting of coke, graphite, acetylene black, carbon black, glassy carbon, hairy carbon, and mixtures thereof.

13. The electrochemical cell of claim 1 wherein the electrolyte is a nonaqueous electrolyte and there is dissolved therein a lithium salt.

14. The electrochemical cell of claim 1 wherein the activated negative electrode and positive electrode provide the electrochemical cell dischargeable to deliver at least one current pulse of an electrical current of a greater amplitude than that of a prepulse current immediately prior to the current pulse.

15. The electrochemical cell of claim 14 wherein the current pulse is about 15.0 mA/cm$^2$ to about 35.0 mA/cm$^2$.

16. The electrochemical cell of claim 1 associated with an implantable medical device powered by the cell.

17. In combination with an implantable medical device requiring at least one current pulse for a medical device operating function, an electrochemical cell which is dischargeable to deliver the current pulse, the cell which comprises:
a) a negative electrode;
b) a positive electrode comprising a cathode active material contacted to a current collector, wherein the cathode active material is mixed with a nitrate additive prior to being contacted to the current collector; and
c) a nonaqueous electrolyte activating the negative electrode and positive electrode, wherein the activated negative electrode and positive electrode provide the electrochemical cell dischargeable to deliver at least one current pulse for the medical device operating function, and wherein the current pulse is of an electrical current of a greater amplitude than that of a prepulse current immediately prior to the current pulse.

18. The combination of claim 17 wherein the nitrate additive has the formula: (RO)N(=O)$_2$, wherein R is an organic group of either a saturated hydrocarbon or heteroatom group containing 1 to 10 carbon atoms, or an unsaturated hydrocarbon or heteroatom group containing 2 to 10 carbon atoms.

19. The combination of claim 17 wherein the nitrate additive is selected from the group consisting of propyl nitrate, isopropyl nitrate, butyl nitrate, isobutyl nitrate, t-butyl nitrate, benzyl nitrate, phenyl nitrate, and mixtures thereof.

20. The combination of claim 17 wherein the nitrate additive is present in the positive electrode in a range of about 0.05% to about 5.0%, by weight.

21. An electrochemical cell, which comprises:
a) an anode comprising lithium;
b) a cathode comprising silver vanadium oxide contacted to a current collector, wherein the silver vanadium oxide is mixed with a nitrate additive prior to being contacted to the current collector; and
c) a liquid, nonaqueous electrolyte operatively associated with the anode and the cathode.

22. The electrochemical cell of claim 21 wherein the nitrate additive has the formula: (RO)N(=O)$_2$, wherein R is an organic group of either a saturated hydrocarbon or heteroatom group containing 1 to 10 carbon atoms, or an unsaturated hydrocarbon or heteroatom group containing 2 to 10 carbon atoms.

23. The electrochemical cell of claim 21 wherein the nitrate additive is selected from the group consisting of propyl nitrate, isopropyl nitrate, butyl nitrate, isobutyl nitrate, t-butyl nitrate, benzyl nitrate, phenyl nitrate, and mixtures thereof.

24. The electrochemical cell of claim 21 wherein the nonaqueous electrolyte comprises a first solvent selected from the group consisting diisopropylether, 1,2-dimethoxyethane, 1,2-diethoxyethane, 1-ethoxy, 2-methoxyethane, dimethyl carbonate, diethyl carbonate, dipropyl carbonate, ethylmethyl carbonate, methylpropyl carbonate, ethylpropyl carbonate, methyl acetate, tetrahydrofuran, diglyme, triglyme, tetraglyme, and mixtures thereof.

25. The electrochemical cell of claim 21 wherein the nonaqueous electrolyte comprises a second solvent selected from the group consisting of propylene carbonate, ethylene carbonate, butylene carbonate, γ-valerolactone, γ-butyrolactone, N-methylpyrrolidinone, dimethyl sulfoxide, acetonitrile, dimethyl formamide, dimethyl acetamide, and mixtures thereof.

26. The electrochemical cell of claim 21 wherein the electrolyte is selected from the group consisting of LiPF$_6$, LiAsF$_6$, LiSbF$_6$, LiBF$_4$, LiClO$_4$, LiAlCl$_4$, LiGaCl$_4$, LiC(SO$_2$CF$_3$)$_3$, LiN(SO$_2$CF$_3$)$_2$, LiSCN, LiO$_3$SCF$_2$CF$_3$, LiC$_6$F$_5$SO$_3$, LiO$_2$CCF$_3$, LiSO$_3$F, LiNO$_3$, LiB(C$_6$H$_5$)$_4$, LiCF$_3$SO$_3$, and mixtures thereof.

27. The electrochemical cell of claim 21 wherein the silver vanadium oxide is of the general formula Ag$_x$V$_2$O$_y$, and wherein the silver vanadium oxide is selected from the group consisting of β-phase silver vanadium oxide that has in the general formula x=0.35 and y=5.18, γ-phase silver vanadium oxide that has in the general formula x=0.80 and y=5.4, ε-phase silver vanadium oxide that has in the general formula x=1.0 and y=5.5, and mixtures thereof.

28. A method for providing an electrochemical cell activated with a nonaqueous electrolyte, comprising the steps of:
a) providing a negative electrode of an anode material contacted to an anode current collector;
b) providing a positive electrode comprising a cathode active material contacted to a cathode current collector, wherein at least one of the anode material and the cathode active material is mixed with a nitrate additive prior to being contacted to the respective anode current collector and cathode current collector, the nitrate additive having the formula: (RO)N(=O)$_2$, wherein R is an organic group of either a saturated hydrocarbon and heteroatom group containing 1 to 10 carbon atoms, or an unsaturated hydrocarbon or heteroatom group containing 2 to 10 carbon atoms; and
c) activating the electrochemical cell with the nonaqueous electrolyte operatively associated with the negative electrode and the positive electrode.

29. The method of claim 28 including selecting the nitrate additive from the group consisting of propyl nitrate, isopropyl nitrate, butyl nitrate, isobutyl nitrate, t-butyl nitrate, benzyl nitrate, phenyl nitrate, and mixtures thereof.

30. The method of claim 28 wherein the nitrate additive is present in at least one of the negative electrode and the positive electrode in a range of about 0.05% to about 5.0%, by weight.

31. The method of claim 28 including providing the nonaqueous electrolyte of a first solvent selected from the group consisting of an ester, an ether, dialkyl carbonate, and mixtures thereof, and a second solvent selected from the group consisting of a cyclic carbonate, a cyclic ester, a cyclic amide, and mixtures thereof.

32. The method of claim 28 including providing the cell as either a primary or a secondary cell.

33. The method of claim 28 wherein the electrochemical cell is a primary cell and selecting the cathode active material from the group consisting of silver vanadium oxide, copper silver vanadium oxide, manganese dioxide, cobalt oxide, nickel oxide, fluorinated carbon, copper oxide, copper sulfide, iron sulfide, iron disulfide, titanium disulfide, copper vanadium oxide, and mixtures thereof.

34. The method of claim 28 wherein the electrochemical cell is a primary cell and providing the negative electrode of an anode active material comprised of lithium or a lithium-aluminum alloy.

35. The method of claim 28 including providing the positive electrode comprising from about 80 to about 99 weight percent of the cathode active material.

36. The method of claim 35 including providing the positive electrode further comprising a binder material and a conductive additive.

37. The method of claim 36 wherein the binder material is a fluoro-resin powder.

38. The method of claim 36 including selecting the conductive additive from the group consisting of carbon, graphite powder, acetylene black, titanium powder, aluminum powder, nickel powder, stainless steel powder, and mixtures thereof.

39. The method of claim 28 including discharging the cell to deliver at least one current pulse of an electrical current of a greater amplitude than that of a prepulse current immediately prior to the current pulse.

40. The method of claim 39 including discharging the cell to deliver at least one current pulse of about 15.0 mA/cm$^2$ to 35.0 mA/cm$^2$.

41. The method of claim 28 including providing the electrochemical cell as a secondary cell and selecting the cathode active material from the group consisting of oxides, sulfides, selenides, and tellurides of metals selected from the group consisting of vanadium, titanium, chromium, copper, molybdenum, niobium, iron, nickel, cobalt, manganese, and mixtures thereof.

42. The method of claim 28 including providing the electrochemical cell as a secondary cell and selecting the anode material from the group consisting of coke, graphite, acetylene black, carbon black, glassy carbon, hairy carbon, and mixtures thereof.

43. The method of claim 28 including powering an implantable medical device with the electrochemical cell.

44. A method for providing an electrochemical cell, comprising the steps of:
   a) providing a negative electrode of lithium;
   b) mixing silver vanadium oxide with a nitrate additive to provide a positive electrode active mixture;
   c) contacting the positive electrode active mixture to a current collector to provide a positive electrode; and
   d) activating the negative electrode and the positive electrode with a nonaqueous electrolyte.

45. The method of claim 44 wherein the nitrate additive has the formula: $(RO)N(=O)_2$, wherein R is an organic group of either a saturated hydrocarbon or heteroatom group containing 1 to 10 carbon atoms, or an unsaturated hydrocarbon or heteroatom group containing 2 to 10 carbon atoms.

46. The method of claim 44 including selecting the nitrate additive from the group consisting of propyl nitrate, isopropyl nitrate, butyl nitrate, isobutyl nitrate, t-butyl nitrate, benzyl nitrate, phenyl nitrate, and mixtures thereof.

47. The method of claim 44 wherein the nitrate additive is present in the positive electrode active mixture in a range of about 0.05% to about 5.0%, by weight.

48. An electrochemical cell comprising a negative electrode, a positive electrode and a nonaqueous electrolyte, the improvement in the cell comprising:
   the negative electrode comprising an anode material contacted to an anode current collector and the positive electrode comprising a cathode active material contacted to a cathode current collector, wherein at least one of the anode material and the cathode active material is mixed with a nitrate additive prior to being contacted to the respective anode current collector and cathode current collector and wherein the nitrate additive is selected from the group consisting of propyl nitrate, isopropyl nitrate, butyl nitrate, isobutyl nitrate, t-butyl nitrate, benzyl nitrate, phenyl nitrate, and mixtures thereof.

49. A secondary electrochemical cell comprising a negative electrode, a positive electrode and a nonaqueous electrolyte, the improvement in the cell comprising:
   the negative electrode comprising a carbonaceous anode material contacted to an anode current collector and the positive electrode comprising a cathode active material contacted to a cathode current collector, the cathode active material being selected from the group consisting of oxides, sulfides, selenides, and tellurides of metals selected from the group consisting of vanadium, titanium, chromium, copper, molybdenum, niobium, iron, nickel, cobalt and manganese, wherein the carbonaceous anode material is mixed with a nitrate additive prior to being contacted to the anode current collector.

50. An electrochemical cell comprising a negative electrode, a positive electrode and a nonaqueous electrolyte, the improvement in the cell comprising:
   the negative electrode comprising an anode material contacted to an anode current collector and the positive electrode comprising a cathode active material contacted to a cathode current collector, wherein at least one of the anode material and the cathode active material is mixed with a nitrate additive prior to being contacted to the respective anode current collector and cathode current collector and wherein the activated negative electrode and positive electrode provide the electrochemical cell dischargeable to deliver at least one current pulse of an electrical current of a greater amplitude than that of a prepulse current immediately prior to the current pulse, the current pulse being about 15.0 mA/cm to about 35.0 mA/cm$^2$.

51. An implantable medical device powered by an electrochemical cell comprising a negative electrode, a positive electrode and a nonaqueous electrolyte, the improvement in the cell comprising:
   the negative electrode comprising an anode material contacted to an anode current collector and the positive electrode comprising a cathode active material contacted to a cathode current collector, wherein at least one of the anode material and the cathode active material is mixed with a nitrate additive prior to being contacted to the respective anode current collector and cathode current collector.

52. A method for providing an electrochemical cell activated with a nonaqueous electrolyte, comprising the steps of:
   a) providing a negative electrode of an anode material contacted to an anode current collector;
   b) providing a positive electrode comprising a cathode active material contacted to a cathode current collector, wherein at least one of the anode material and the cathode active material is mixed with a nitrate additive prior to being contacted to the respective anode current collector and cathode current collector, the nitrate additive being selected from the group consisting of propyl nitrate, isopropyl nitrate, butyl nitrate, isobutyl nitrate, t-butyl nitrate, benzyl nitrate, phenyl nitrate, and mixtures thereof; and
   c) activating the electrochemical cell with the nonaqueous electrolyte operatively associated with the negative electrode and the positive electrode.

53. A method for providing a secondary electrochemical cell activated with a nonaqueous electrolyte, comprising the steps of:
   a) providing a negative electrode of a carbonaceous anode material contacted to an anode current collector, wherein the carbonaceous anode material is mixed with a nitrate additive prior to being contacted to the anode current collector;
   b) providing a positive electrode comprising a cathode active material selected from the group consisting of oxides, sulfides, selenides, and tellurides of metals selected from the group consisting of vanadium, titanium, chromium, copper, molybdenum, niobium, iron, nickel, cobalt, manganese, and mixtures thereof contacted to a cathode current collector; and
   c) activating the electrochemical cell with the nonaqueous electrolyte operatively associated with the negative electrode and the positive electrode.

54. A method for providing electrical energy from an electrochemical cell activated with a nonaqueous electrolyte, comprising the steps of:
   a) providing a negative electrode of an anode material contacted to an anode current collector;
   b) providing a positive electrode comprising a cathode active material contacted to a cathode current collector, wherein at least one of the anode material and the cathode material is mixed with a nitrate additive prior to being contacted to the anode current collector;
   c) activating the electrochemical cell with the nonaqueous electrolyte operatively associated with the negative electrode and the positive electrode; and
   d) discharging the cell to deliver at least one current pulse of about 15.0 mA/cm$^2$ to 35.0 mA/cm$^2$.

55. A method for powering an implantable medical device, comprising the steps of:
   a) providing the medical device;
   b) providing an electrochemical cell, which comprises:
      i) a negative electrode of an anode material contacted to an anode current collector;
      ii) a positive electrode comprising a cathode active material contacted to a cathode current collector, wherein at least one of the anode material and the cathode active material is mixed with a nitrate additive prior to being contacted to the respective anode current collector and cathode current collector; and
      iii) a nonaqueous electrolyte operatively associated with the negative electrode and the positive electrode; and
   c) connecting the electrochemical cell to the medical device as its power source.

* * * * *